United States Patent [19]

Miyake

[11] Patent Number: 4,520,521

[45] Date of Patent: Jun. 4, 1985

[54] PROCESS OF MANUFACTURING A SLEEVE AND WEDGE FOR AN ANCHOR BOLT

[76] Inventor: Akira Miyake, 5-2, Imagawa 2-chome, Higashi, Sumiyoshi-ku, Osaka-shi, Osaka, Japan

[21] Appl. No.: 473,341

[22] Filed: Mar. 8, 1983

[30] Foreign Application Priority Data

Dec. 2, 1982 [JP] Japan ................................ 57-212312

[51] Int. Cl.³ .......................... B21K 1/44; B21D 31/00
[52] U.S. Cl. .................................... 10/27 PH; 72/377
[58] Field of Search .............. 10/27 R, 27 FS, 27 PH; 72/356, 377; 411/40

[56] References Cited

U.S. PATENT DOCUMENTS

| 2,206,881 | 7/1940 | Crowley | 10/27 PH |
| 3,114,921 | 12/1963 | Carusi | 10/27 PH |
| 3,169,256 | 2/1965 | Siebol et al. | 10/27 PH |
| 3,186,209 | 6/1965 | Friedman | 10/27 PH |

FOREIGN PATENT DOCUMENTS 2910406  9/1980  Fed. Rep. of Germany ... 10/27 PH

*Primary Examiner*—E. Michael Combs
*Attorney, Agent, or Firm*—Wenderoth, Lind & Ponack

[57] ABSTRACT

A structure and method of manufacture of a sleeve for an anchor bolt which has a wedge held in its bolt hole, not separate from the sleeve body. The wedge is formed by striking the sleeve from the side opposite to the bolt hole on an area smaller than the cross-sectional area of the bolt hole.

7 Claims, 7 Drawing Figures

PROCESS OF MANUFACTURING A SLEEVE AND WEDGE FOR AN ANCHOR BOLT

BACKGROUND OF THE INVENTION

The present invention relates to improvement in a sleeve for an anchor bolt used on concrete or lightweight concrete.

FIG. 1 shows a conventional sleeve for an anchor bolt which is formed with a partially threaded through hole 1 and a plurality of axial slits 2. After the sleeve has been put in a hole in concrete, a separate wedge 3 is driven into the sleeve in the direction of arrow to spread open the slitted end of the sleeve, thereby ensuring that the sleeve is fastened in concrete. With the conventional sleeve, the wedge was made separately from the sleeve body to a suitable size for the hole in the body. This increases the manufacturing cost and entails much labor. Further, the pairs each consisting of a body and a wedge are liable to be disturbed because the wedge often gets lost. A correct wedge has to be driven into a sleeve body. Another problem is that since the wedge is a separate member, it might become loose from the slitted end as it is subjected to vibration. This decreases the anchoring effect of the anchor bolt.

SUMMARY OF THE INVENTION

An object of the present invention is to provide a sleeve for an anchor bolt which obviates the aforesaid shortcomings.

Another object of the present invention is to provide a sleeve for an anchor bolt which has an excellent anchoring effect.

A further object of the present invention is to provide a sleeve for an anchor bolt which can be mass-produced at a low manufacturing cost.

According to the present invention there is provided a sleeve for an anchor bolt comprising a body formed at one end thereof with a bolt hole for an anchor bolt and at the other end thereof with a plurality of slits extending axially from said other end to half way of the length of said sleeve and a blind hole of a smaller diameter than said bolt hole, and a wedge in the form of a truncated cone held in said sleeve between said bolt hole and said blind hole, said wedge being not separate from said body but sheared therefrom by a striking force applied to the end opposite to said bolt hole on an area smaller than the sectional area of said bolt hole.

Other objects and features of the present invention will become apparent from the following description taken with reference to the accompanying drawings, in which:

DETAILED DESCRIPTION OF THE INVENTION

It will be described how the sleeve for an anchor bolt according to the present invention is manufactured with reference to FIGS. 2-6.

Figure 1:
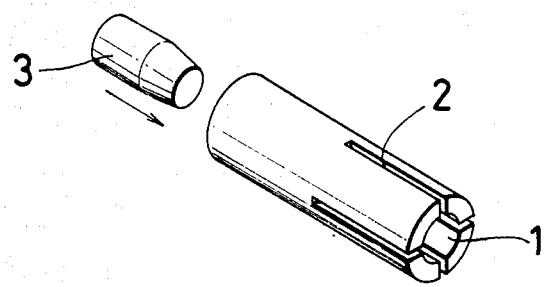
FIG. 1 is a perspective view of a conventional sleeve for an anchor bolt.
Figure 2:
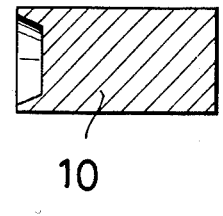
FIGS. 2-4 are sectional views showing how the sleeve according to the present invention is made.
Figure 3:
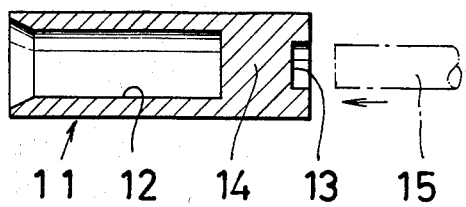

Firstly, a solid bar stock is cut to suitable lengths and each cut piece is formed to a shape such as shown in FIG. 2. The stock of FIG. 2 is then cold or hot formed into a shape such as shown in FIG. 3 having a bolt hole 12 and a recess 13. As will be seen, the material is drawn out by forming to a substantially tubular shape with some amount of material 14 left between the bolt hole 12 and the recess 13. The diameter of the recess or blind hole 13 is smaller than that of the bolt hole 12.

Figure 4:
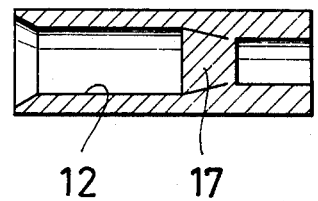

The stock 11 of FIG. 3 is struck with the pin 15 of a forming machine in the recess 13. When a sufficiently large striking force is applied, the solid portion 14 is sheared to move to the left in FIG. 3 along oblique shear lines but with the portion adjacent a now extended recess (rear hole) 13, integrally attached to the sleeve body, as shown in FIG. 4. The stock of FIG. 4 is then tapped to provide a bolt hole 12 with a thread and is finally worked to form four slits 16 extending axially to about half of the entire length.

Figure 5:
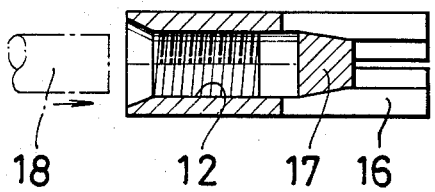
FIG. 5 is a sectional view of a sleeve according to the present invention.
Figure 6:
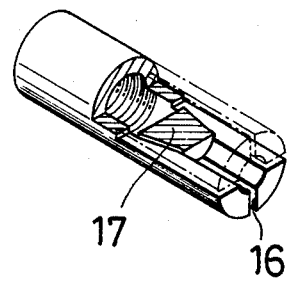
FIG. 6 is a partially cutaway perspective view of the same.

FIGS. 5 and 6 show a finished sleeve according to the present invention manufactured as mentioned above. The sheared portion 17 serves as a wedge. Like the conventional sleeve, the sleeve according to the present invention is put in an anchor hole provided in concrete or the like with its bolt hole 12 exposed. Then, a bar 18 is put into the bolt hole 12 and the wedge 17 is struck by the bar toward the slitted end of the sleeve to spread the sleeve.

Although in this embodiment the blind hole 13 is formed to hold the pin in the forming machine therein, this is not a limitation. The pin may be applied on the not-recessed end surface of the sleeve. The pin may have a circular or multi-angular section. It is essential that the diameter of the pin be smaller than the diameter of the bolt hole 12. Therefore, the wedge 17 will be in the form of a truncated cone.

Figure 7:
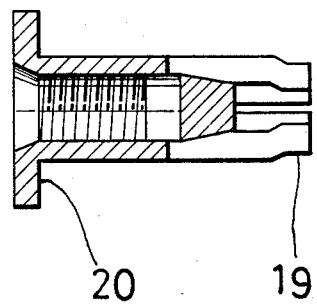
FIG. 7 is a sectional view of another embodiment.

Referring to FIG. 7 showing another embodiment, the slitted end of the sleeve is narrowed at 19 and its opposite end is formed with a flange 20.

In accordance with the present invention, the portion 14 is forcedly sheared from the sleeve body. Therefore, the surfaces between the wedge portion 17 and the surrounding wall of the sleeve body are rough shear surfaces. Due to this fact, when the wedge portion is forcedly driven into the sleeve body to spread the slitted half, it will seize with the surrounding wall of the sleeve body by abrasion and heat produced by abrasion. Therefore, once driven up, the wedge 17 will completely stick in the sleeve body. Accordingly there is no danger of the wedge loosening and falling out of the sleeve body if subjected to vibration.

Because the sheared portion is securely held in the sleeve body through burrs even after sheared, it does not have to be intentionally kept in the sleeve. With the conventional sleeve, the wedge had to be held in the sleeve with an adhesive or a cap so as not to get lost.

Further, due to the fact that the sleeve body and the wedge can be made by forming at one time, the manufacturing cost is much less than in the conventional method in which they were made separately.

What is claimed is:

1. A process for manufacturing a sleeve and wedge for an anchor bolt, comprising the steps of:
   (1) cutting a bar stock into longitudinally extending pieces of predetermined length;
   (2) forming a longitudinally extending bolt hole having a cross-sectional area, at one end of each piece, the bolt hole terminating at an end surface having an area equal to the cross-sectional area of the bolt hole, inside the piece;
   (3) forming slits in each piece longitudinally extending from the end of each piece opposite the one end to about the midpoint of the longitudinal extend of the piece; and
   (4) longitudinally striking the other end of each piece only over a striking area less than the area of the end surface of the bolt hole so as to shear a wedge from each piece, the wedge having opposite end surfaces defined by the end surface of the bolt hole and said striking area, without removing the wedge from inside the piece.

2. A process as in claim 1, further comprising the step of forming a longitudinally extending blind hole in the other end of each piece substantially simultaneously with the step of forming the bolt hole, the blind hole having a cross-sectional area smaller than that of the bolt hole.

3. A process as in claim 2, wherein said step of striking includes the step of completely breaking any integral connection between the wedge and the piece from which the wedge is sheared, said process further comprising the step of preventing the wedge from falling out of the bolt hole with structure inside of the bolt hole.

4. A process in claim 2, wherein the step of forming the slits include the step of forming diametrical slits which cross each other and which extend into the end of the wedge remote from the bolt hole.

5. A process as in claim 4, wherein said step of striking includes the step of completely breaking any integral connection between the wedge and the piece from which the wedge is sheared, said process further comprising the step of preventing the wedge from falling out of the bolt hole with structure inside of the bolt hole.

6. A process as in claim 1, wherein said step of striking includes the step of completely breaking any integral connection between the wedge and the piece from which the wedge is sheared, said process further comprising the step of preventing the wedge from falling out of the bolt hole with structure inside of the bolt hole.

7. A process in claim 1, wherein the step of forming the slits include the step of forming diametrical slits which cross each other and which extend into the end of the wedge remote from the bolt hole.

* * * * *